United States Patent
Liu (10) Patent No.: US 8,132,765 B2
(45) Date of Patent: Mar. 13, 2012

(54) COLLAPSIBLE LOCKABLE SUPPORT FRAME ASSEMBLY AND LOCKING MECHANISM USED THEREIN

(75) Inventor: Lien-Ming Liu, Sinjhuang (TW)

(73) Assignee: Jarllytec Co., Ltd., Sinjhuang (TW)

( * ) Notice: Subject to any disclaimer, the term of this patent is extended or adjusted under 35 U.S.C. 154(b) by 126 days.

(21) Appl. No.: 12/707,864

(22) Filed: Feb. 18, 2010

(65) Prior Publication Data

US 2010/0252695 A1   Oct. 7, 2010

(30) Foreign Application Priority Data

Apr. 3, 2009   (TW) .............................. 98111431 A (51) Int. Cl.
*F16M 11/00* (2006.01)

(52) U.S. Cl. .............. 248/157; 248/346.06; 248/917
(58) Field of Classification Search .......... 248/917–923, 248/284.1, 279.1, 125.9, 288.11, 291; 361/679.21, 361/679.22; 292/1, 256, 256.69, 256.75, 292/DIG. 49
See application file for complete search history.

(56) References Cited

U.S. PATENT DOCUMENTS

| 3,003,803 | A | * | 10/1961 | Kirk | 292/347 |
| 3,142,447 | A | * | 7/1964 | Bodian | 362/319 |
| 3,391,891 | A | * | 7/1968 | Garden | 248/311.2 |
| 3,762,751 | A | * | 10/1973 | Little | 292/196 |
| 7,775,487 | B2 | * | 8/2010 | Hu | 248/157 |
| 7,775,494 | B2 | * | 8/2010 | Yen et al. | 248/284.1 |

* cited by examiner

*Primary Examiner* — Nkeisha Smith
(74) *Attorney, Agent, or Firm* — Guice Patents PLLC (57) ABSTRACT

A collapsible lockable support frame assembly includes a support frame pivoted to the support arm of a stand and having two parallel sliding rails, a slide holder carrying a positioning member at the back side and coupled to and movable along the sliding rails of the support frame for holding a display device and a locking mechanism having a casing affixed to the support frame and an upper stop member and a lower stop member pivotally swingingly connected to the casing. When the support frame is turned from a vertical position to a horizontal position, the upper stop member and the lower stop member are forced by the gravity thereof to turn out of the casing so that the upper stop member stops the positioning member from outward displacement to lock the slide holder, facilitating packing and delivery and the lower stop member limits the inward displacement distance of the slide holder to prohibit the display device from hitting the support arm of the stand.

27 Claims, 8 Drawing Sheets

COLLAPSIBLE LOCKABLE SUPPORT FRAME ASSEMBLY AND LOCKING MECHANISM USED THEREIN

BACKGROUND OF THE INVENTION

1. Field of the Invention

The present invention relates to support frames and more particularly, to a collapsible lockable support frame assembly and locking mechanism used therein for supporting a display device.

2. Description of the Related Art

Following population of planar display devices, many advanced display device support frames have been created, facilitating horizontal angle adjustment and locking, tilting angle adjustment and locking and/or elevation adjustment and locking. A display device support frame is known comprising a base, a support frame mounted on the base, and a slide holder mounted on and movable along the support member for holding a display device. The support frame comprises two vertical fixed rails and two sliding rails respectively slidably coupled to the fixed rails. The slide holder is slidably coupled to the sliding rails. In order to have the display panel be positioned in the adjusted position, a constant force spring is provided between the fixed rails and the sliding rails to impart an upward force to the slide holder against the weight of the display device.

To facilitate packing and delivery or when the user wishes to move the display device or to receive the display device, the display device can be turned with the support frame relative to the base from the operative vertical position to the non-operative horizontal position, reducing the packing size and the transportation cost or saving space occupation or facilitating movement.

However, when the support frame is set in the non-operative horizontal position, the weight of the display device cannot be kept in balance with the spring force of the constant force spring. In this case, the display device may be forced to move relative to the support frame accidentally during delivery, causing damage.

Further, after the display device has been moved from vertical to horizontal, it must be pushed inwards to minimize space occupation. However, if the inward displacement distance is not limited, the display device may hit the support arm of the base. Therefore, this design of display device support frame is not satisfactory in function.

Therefore, it is desirable to provide a display device support frame structure, which allows locking of the display device in the collapsed horizontal position.

SUMMARY OF THE INVENTION

The present invention has been accomplished under the circumstances in view. It is one object of the present invention to provide a collapsible lockable support frame assembly, which uses a locking mechanism having an upper stop member for stopping a slide holder thereof from outward displacement to lock the display device that is mounted on the slide holder when the support frame is turned from the operative vertical position to the non-operative horizontal position, facilitating packing and delivery.

It is another object of the present invention to provide a locking mechanism for collapsible lockable support frame assembly, which has a lower stop member for stopping the slide holder from inward displacement when the support frame is turned from the operative vertical position to the non-operative horizontal position, preventing the display device that is mounted on the slide holder from hitting the support arm of the stand to which the support frame of the collapsible lockable support frame assembly is pivotally connected.

It is still another object of the present invention to provide a locking mechanism for collapsible lockable support frame assembly, which has an upper stop member and a lower stop member pivotally swingingly connected to a casing thereof in such a manner that the body of the upper stop member and the body of the lower stop member are constantly kept face-down subject to the effect of the gravity and the pivot end of the upper stop member and the pivot end of the lower stop member are constantly kept face up, and therefore when the casing is rotated, the upper stop member and the lower stop member are turned out of the casing to provide a locking and position limit function.

To achieve these and other objects of the present invention, a collapsible lockable support frame assembly is pivotally connected to a stand with at least one pivot shaft and biasable relative to the stand between a non-operative horizontal position and an operative vertical position, comprising: a support frame, the support frame comprising two sliding rails arranged in parallel at two opposite lateral sides thereof; a slide holder coupled to and movable along the sliding rails of the support frame, the slide holder carrying a positioning member at a back side thereof; and a locking mechanism, the locking mechanism comprising a casing affixed to the support frame, an upper stop member and a lower stop member, the upper stop member having pivot connection means disposed at a top side thereof and pivotally swingingly connected to the casing, the lower stop member having pivot connection means disposed at a top side thereof and pivotally connected to the casing below the elevation of the upper stop member, wherein when the support frame is rotated from the operative vertical position to the non-operative horizontal position, the upper stop member and the lower stop member are forced by the gravity thereof to turn out swingingly of the casing so that the upper stop member stops the positioning member from outward displacement to lock the slide holder and the positioning member is limited by the lower stop member to prohibit the slide holder from an inward displacement.

To achieve these and other objects of the present invention, a collapsible lockable support frame assembly is pivotally connected to a stand with at least one pivot shaft and biasable relative to the stand between a non-operative horizontal position and an operative vertical position, comprising: a support frame, the support frame comprising two sliding rails arranged in parallel at two opposite lateral sides thereof; a slide holder coupled to and movable along the sliding rails of the support frame, the slide holder comprising a positioning rod and a stop edge disposed at a back side thereof; and a locking mechanism, the locking mechanism comprising a casing affixed to the support frame, an upper stop member and a lower stop member, the upper stop member having pivot connection means disposed at a top side thereof and pivotally swingingly connected to the casing, the lower stop member having pivot connection means disposed at a top side thereof and pivotally connected to the casing below the elevation of the upper stop member; wherein when the support frame is rotated from the operative vertical position to the non-operative horizontal position, the upper stop member and the lower stop member are forced by the gravity thereof to turn out of the casing so that the upper stop member stops the positioning rod to lock the slide holder and the stop edge is stopped against the lower stop member to prohibit the slide holder from an inward displacement.

To achieve these and other objects of the present invention, a collapsible lockable support frame assembly is pivotally connected to a stand with at least one pivot shaft and biasable relative to the stand between a non-operative horizontal position and an operative vertical position, comprising: a support frame, the support frame comprising two sliding rails arranged in parallel at two opposite lateral sides thereof; a slide holder coupled to and movable along the sliding rails of the support frame, the slide holder comprising a stop edge disposed at a back side thereof; and a locking mechanism, the locking mechanism comprising a casing affixed to the support frame, an upper stop member and a lower stop member, the upper stop member having pivot connection means disposed at a top side thereof and pivotally swingingly connected to the casing, the lower stop member having pivot connection means disposed at a top side thereof and pivotally connected to the casing below the elevation of the upper stop member; wherein when the support frame is rotated from the operative vertical position to the non-operative horizontal position, the upper stop member and the lower stop member are forced by the gravity thereof to turn out of the casing so that the stop edge stops the lower stop member to prohibit the slide holder from an inward displacement.

To achieve these and other objects of the present invention, a locking mechanism, comprising: a casing; an upper stop member, the upper stop member having pivot connection means disposed at a top side thereof and pivotally connected swingingly to the casing; and a lower stop member, the lower stop member having pivot connection means disposed at a top side thereof and pivotally connected to the casing below the elevation of the upper stop member; wherein when the casing is rotated, the upper stop member and the lower stop member are forced by the gravity thereof to turn out of the casing to provide a position limit effect.

DETAILED DESCRIPTION OF THE PREFERRED EMBODIMENT

Figure 1:
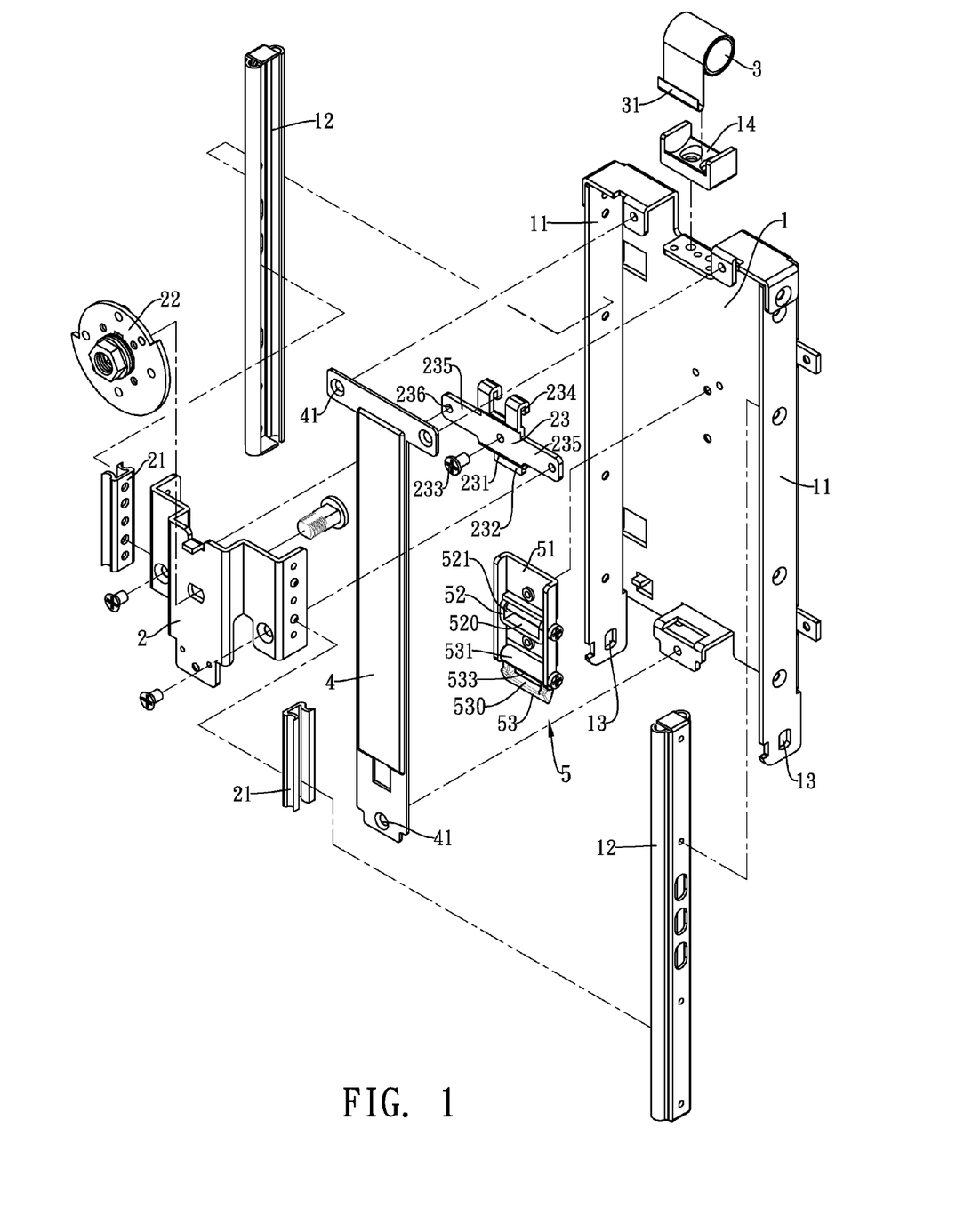
FIG. 1 is an exploded view of a collapsible lockable support frame assembly in accordance with the present invention.
Figure 2:
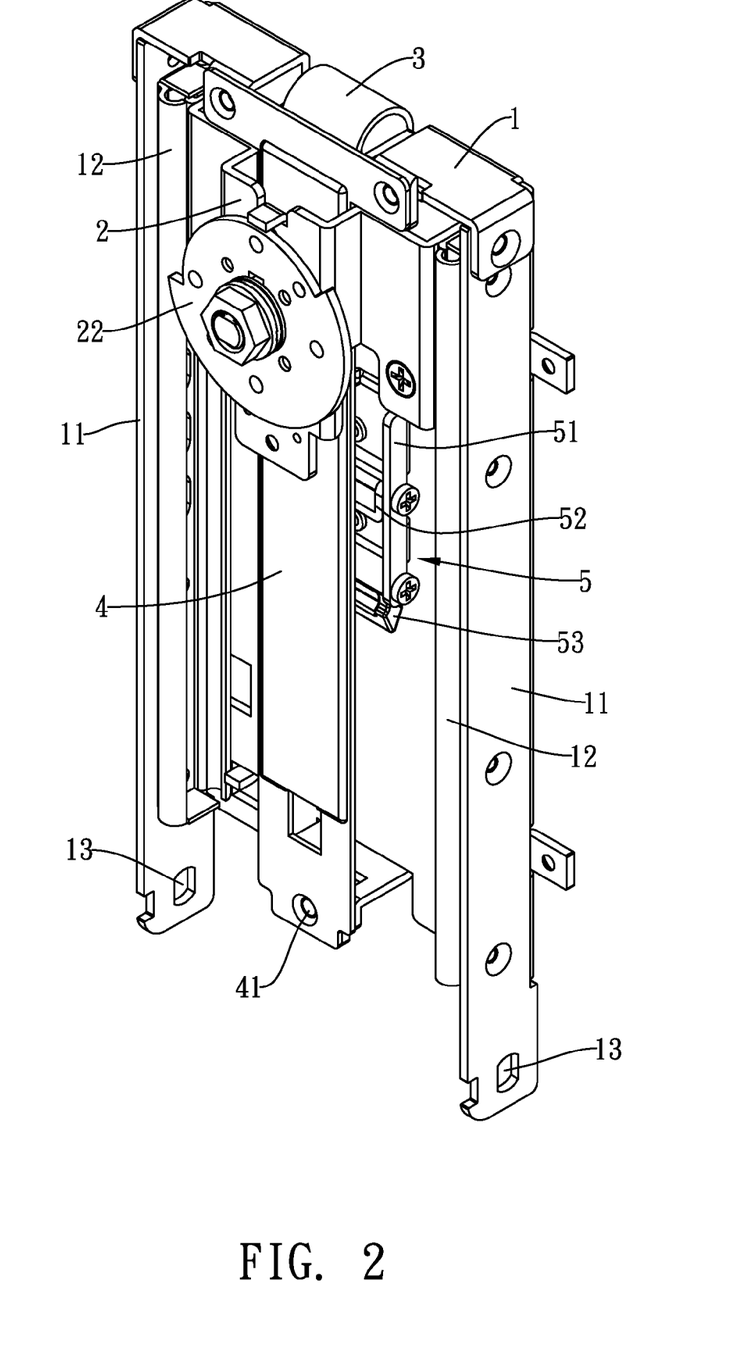
FIG. 2 is an elevational assembly view of the collapsible lockable support frame assembly in accordance with the present invention.

Referring to FIGS. 1 and 2, a collapsible lockable support frame assembly in accordance with the present invention is shown comprising a support frame 1, a slide holder 2, a constant force spring 3, a bumper 4 and a locking mechanism 5.

Figure 3:
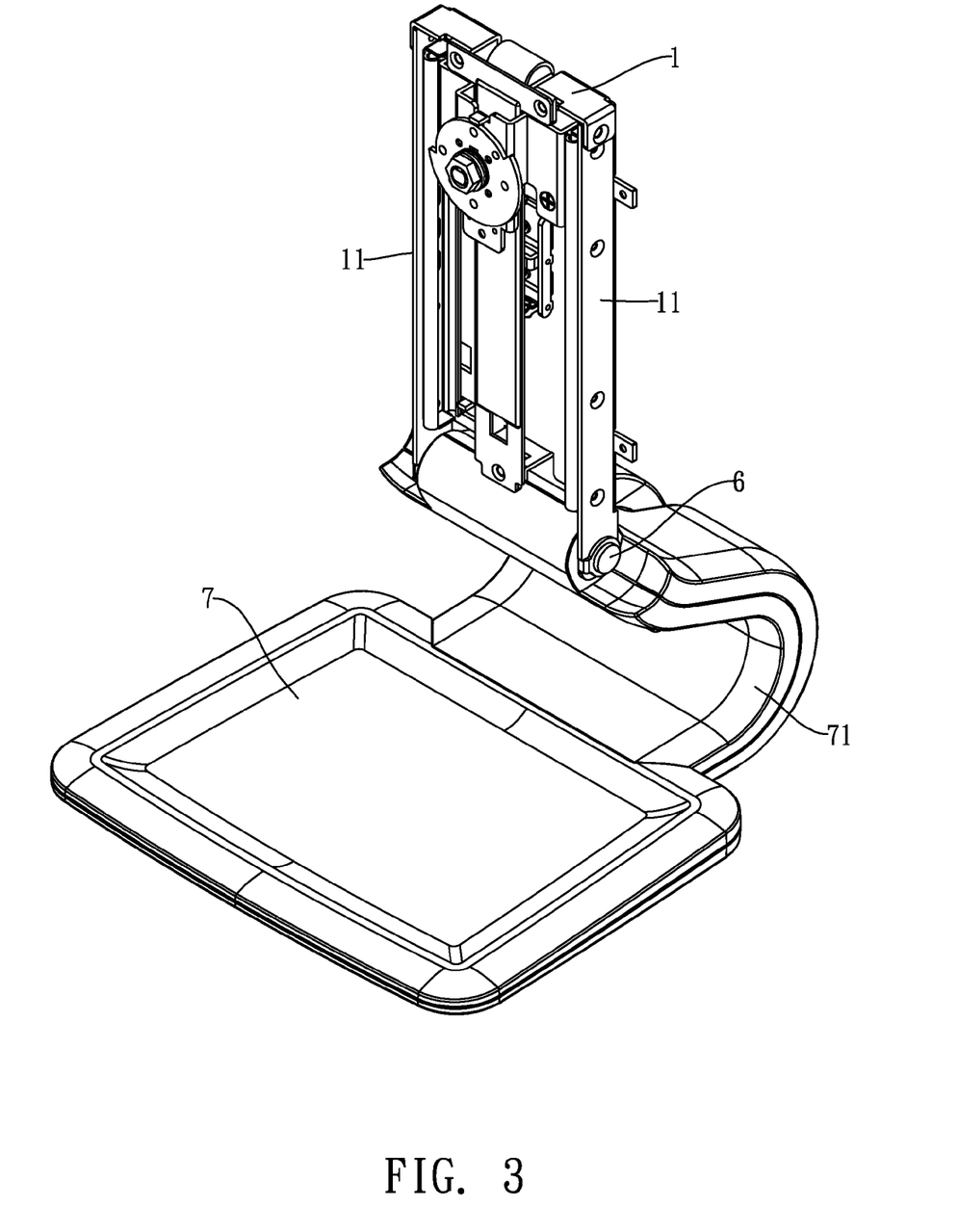
FIG. 3 is a schematic drawing showing the collapsible lockable support frame assembly fastened to a stand according to the present invention.

The support frame 1 comprises two side flanges 11 respectively perpendicularly extended from two opposite lateral sides thereof, two sliding rails 12 respectively fixedly fastened to the two side flanges 11 and a pivot hole 13 located on the bottom end of each of the two side flanges 11. A pivot shaft 6 is inserted through the two pivot holes 13 to pivotally connect the support frame 1 to a support arm 71 of a stand 7, as shown in FIG. 3, so that the support frame 1 can be turned relative to the support arm 71 between a non-operative horizontal position and an operative vertical position.

The slide holder 2 has two sliding blocks 21 respectively fixedly provided at two opposite lateral sides thereof and respectively slidably coupled to the sliding rails 12 of the support frame 1, and a mounting plate 22 located on the front side thereof for holding a display device. Thus, the display device can be moved with the slide holder 2 up and down along the sliding rails 12.

Figure 4:
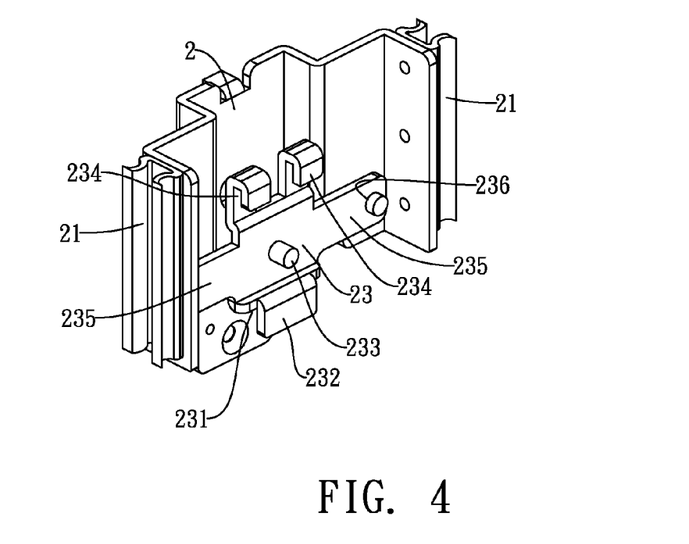
FIG. 4 is an oblique rear elevation of a part of the present invention, showing the positioning member fastened to the slide holder.

Referring to FIG. 4, a positioning member 23 is provided at the back side of the slide holder 2. The positioning member 23 has a stop edge 231 and a plug portion 232 disposed at the bottom side, a positioning rod, for example, positioning screw 233 located on the middle, hooked locating portions 234 disposed at the top side, two extension portions 235 disposed at two opposite lateral sides and a mounting through hole 236 located on each of the two extension portions 235 for fixation to the slide holder 2.

The constant force spring 3 is connected between the support frame 1 and the slide holder 2 to impart an upward force to the slide holder 2 relative to the support frame 1. The constant force spring 3 is set in a receptacle 14 at the top side of the support frame 1, having the distal end 31 thereof affixed to the hooked locating portions 234 of the positioning member 23.

The bumper 4 is a narrow elongated bar provided in front of the constant force spring 3, having mounting through holes 41 located on the top and bottom sides thereof and respectively affixed to the support frame 1 with fastening elements (not shown). After installation, the bumper 4 is located between the slide holder 2 and the positioning member 23. The bumper 4 is adapted to isolate the plastic shell of the display device from the constant force spring 3, avoiding the plastic shell of the display device from touching the constant force spring 3 directly when it is forced inwards.

Figure 5:
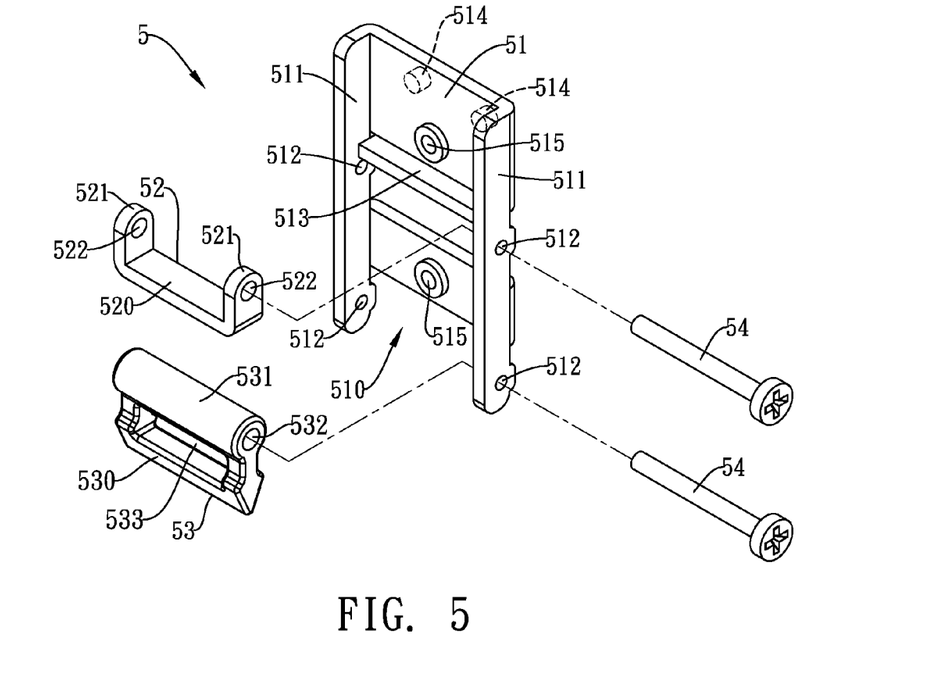
FIG. 5 is an exploded view of the locking mechanism of the collapsible lockable support frame assembly in accordance with the present invention.

Referring to FIG. 5, the locking mechanism 5 comprises a casing 51 affixed to the support frame 1 and defining therein an accommodation space 510, and an upper stop member 52 having a body 520 and a lower stop member 53 having a body 530 respectively pivotally swingingly connected with pivot connection means 521 and 531 thereof to the casing 51. The upper stop member 52 is a substantially U-shaped member. The pivot connection means 521 is disposed at two sides of the body 520 and has a pivot hole 522 at each side. The pivot connection means 531 of the lower stop member 53 is disposed above the body 520 of the upper stop member 52 and defines therein a pivot hole 532. The casing 51 has two side flanges 511 arranged at two opposite lateral sides, and mounting through holes 512 located on each of the two side flanges 511 at different elevations. Two pivot shafts 54 are respectively inserted through the pivot holes 522 of the upper stop member 52 and the pivot hole 532 of the lower stop member 53 to pivotally connect the upper stop member 52 and the lower top member 53 to the mounting through holes 512 of the casing 51 at different elevations. The pivot shafts 54 are respectively loosely coupled to the upper stop member 52 and the lower top member 53.

Figure 6:
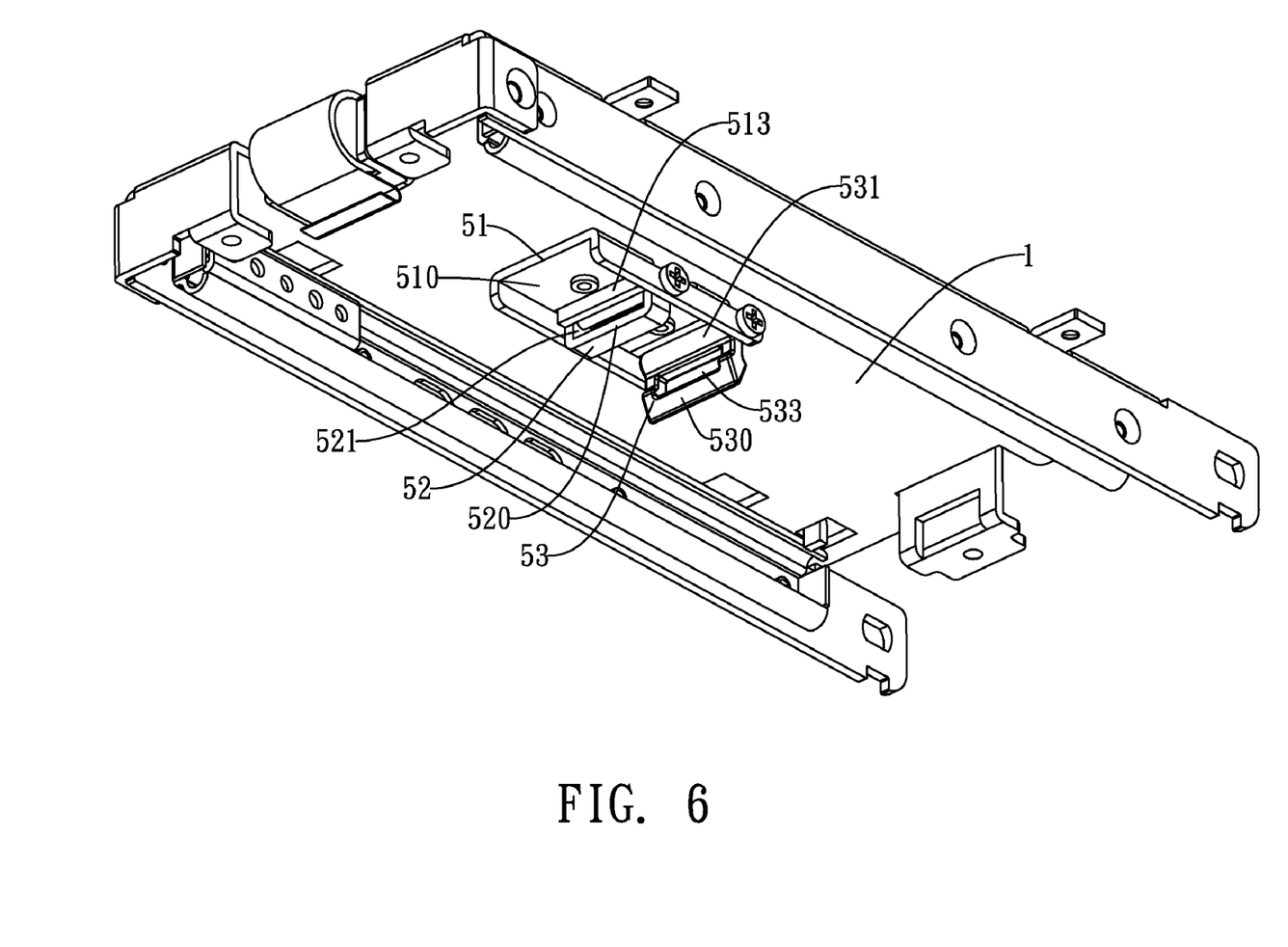
FIG. 6 is a schematic drawing of the present invention, showing the status of the upper stop member and the lower stop member after the support frame set in the non-operative horizontal position.

When rotating the casing 51, the body 520 of the upper stop member 52 and the body 530 of the lower top member 53 are kept face-down and the pivot connection means 521 of the upper stop member 52 and the pivot connection means 531 of the lower stop member 53 are kept face-up subject to their gravity effect. By means of the respective pivot connection means 521 and 531, the upper stop member 52 and the lower top member 53 can be turned about the associating pivot shafts 54 in and out of the accommodation space 510. Thus, as shown in FIG. 6, when the support frame 1 is rotated to the non-operative horizontal position, the casing 51 is moved with the support frame 1 to the horizontal position. At this time, subject to the respective gravity effect, the body 520 and the body 530 are kept face-down and the pivot connection means 521 and 531 are kept face-up to provide a position-limit function.

The upper stop member 52 further has a stop block 513 at the top side. When the upper stop member 52 is turned out of the casing 51, it is stopped at the stop block 513. The lower stop member 53 further has a position limit hole 533. When the lower stop member 53 is turned out of the casing 51, the plug portion 232 of the positioning member 23 of the slide holder 2 is plugged into the position limit hole 533 to limit the inward displacement of the slide holder 2. Further, the lower stop member 53 has a double beveled bottom edge so that the bottom end is constantly kept face-down.

The casing 51 further has a plurality of locating rods 514 and mounting holes 515 on the back side. The support frame 1 has locating holes and mounting holes corresponding to the locating rods 514 and mounting holes 515 of the casing 51. By means of fastening the locating rods 514 and mounting holes 515 of the casing 51 to the locating holes and mounting holes of the support frame 1, the casing 51 is affixed to the support frame 1.

Figure 7:
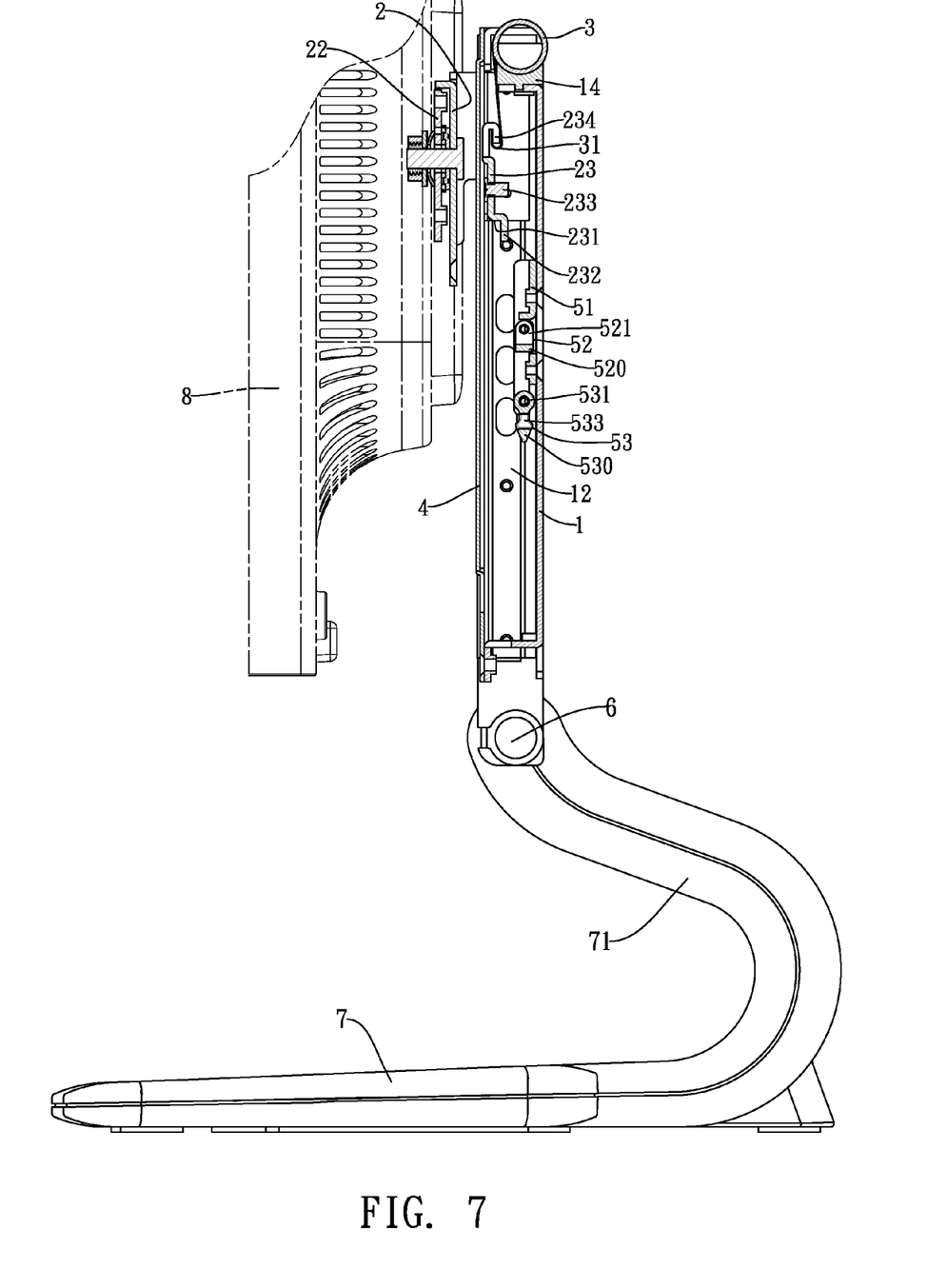
FIG. 7 is a schematic sectional view of the present invention, showing the support frame set in the operative vertical position.

Referring to FIG. 7, when the support frame 1 is kept in the vertical position, the upper stop member 52 and the lower stop member 53 are received inside the casing 51, and the display device 8 can be moved up and down to adjust its elevational position. When the plug portion 232 and positioning screw 233 of the positioning member 23 of the slide holder 2 are moved to the elevations corresponding to the upper stop member 52 and the lower stop member 53, they do not interfere with the upper stop member 52 and the lower stop member 53, and therefore the display device can be freely adjusted to the desired height.

Figure 8:
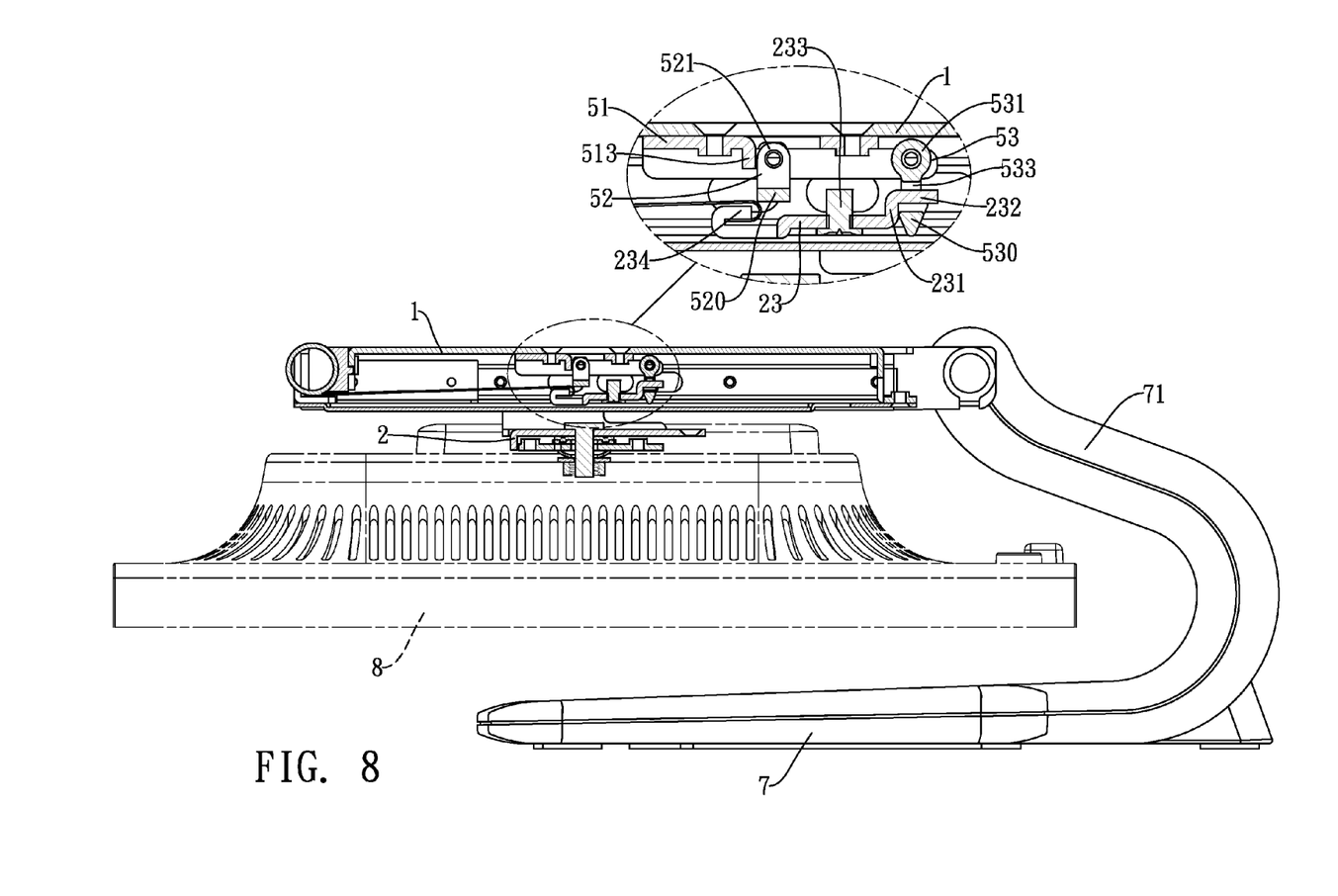
FIG. 8 is a schematic sectional view of the present invention, showing the support frame set in the non-operative horizontal position.

Referring to FIG. 8, to facilitate storage or movement of the display device 8, the display device 8 can be turned with the support frame 1 from the vertical position to the horizontal position to reduce the dimension. When the support frame 1 is rotated to the horizontal position, the casing 51 is kept in horizontal, at this time, the upper stop member 52 and the lower stop member 53 are turned out swingingly of the casing 51. Thereafter, push the display device 8 inwards. At this time, the slide holder 2 and the positioning member 23 are moved with the display device 8 inwards. When the plug portion 232 of the positioning member 23 touches the body 520 of the upper stop member 52, rotate the upper stop member 52 toward the inside of the casing 51. When the plug portion 232 of the positioning member 23 is forced into the position limit hole 533 of the lower stop member 53, the stop edge 231 of positioning member 23 is stopped against the body 530 of the lower stop member 53, thereby limiting the inward displacement distance of the slide holder 2 and prohibiting the display device 8 from hitting the support arm 71 of the stand 7. At this time, the upper stop member 52 is forced by its gravity to turn out of the casing 51.

Figure 9:
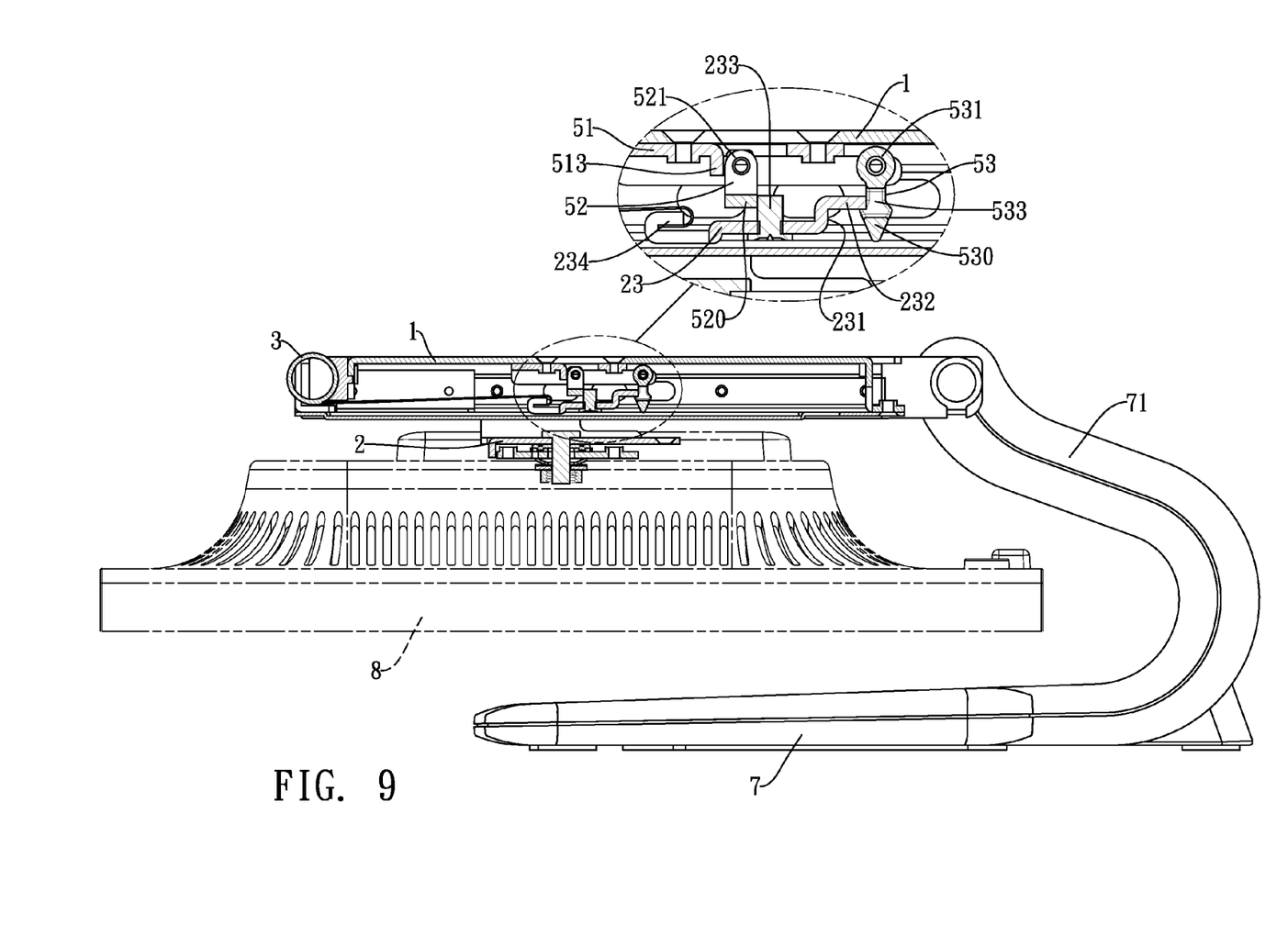
FIG. 9 is a schematic sectional view of the present invention, showing the support frame set in the non-operative horizontal position and locked.

Referring to FIG. 9, when released the display device 8, the return force of the constant force spring 3 pushes the display device 8 outward to force positioning screw 233 of the positioning member 23 to touch the body 520 of the upper stop member 52. When the positioning screw 233 of the positioning member 23 touches the body 520 of the upper stop member 52, the upper stop member 52 is kept stopped by the stop block 513 of the casing 51, and therefore the upper stop member 52 is immovable to stop the positioning screw 233 in place. At this time, the slide holder 2 and the display device 8 are locked and prohibited from outward displacement.

The upper stop member 52 stops the slide holder 2 from outward displacement, causing the slide holder 2 to be locked. The lower stop member 53 limits the inward displacement distance of the slide holder 2, prohibiting the display device 8 from hitting the support arm 71 of the stand 7.

When wishing to open the display device 8, rotate the display device 8 and the support frame 1 from the non-operative horizontal position to the operative vertical position. At this time, the lower stop member 53 is forced by its gravity to move to the inside of the casing 51, and therefore the lower stop member 53 does not provide the position limit function at this time. When moving the display device 8 downwards, the positioning screw 233 of the positioning member 23 is moved away from the upper stop member 52, allowing the upper stop member 52 to move to the inside of the casing 51 without providing the position limit function. At this time, the display device 8 can be freely adjusted to the desired height.

By means of mounting the positioning member 23 on the slide holder 2 and using the locking mechanism 5 to stop the positioning member 23, the invention provides a locking function and limits the inward displacement distance of the display device when collapsed. Because the bumper 4 is disposed at the back side relative to the slide holder 2 to separate the slide holder 2 from the locking mechanism 5, the positioning member 23 must be disposed at the back side relative to the bumper 4 for locking with the slide holder 2 so that the positioning member 23 and the locking mechanism 5 provide a position limit effect. The bumper 4 may be omitted. In this case, the positioning screw 233 is used to stop the upper stop member 52 of the locking mechanism 5 and the plug portion 232 of the positioning member 23 is inserted into the position limit hole 533 of the lower stop member 53, for enabling the stop edge 231 to stop the lower stop member 53 and to further limit the inward displacement distance of the slide holder 2.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. A collapsible lockable support frame assembly pivotally connected to a stand with at least one pivot shaft and biasable relative to said stand between a non-operative horizontal position and an operative vertical position, comprising:
a support frame, said support frame comprising two sliding rails arranged in parallel at two opposite lateral sides thereof;
a slide holder coupled to and movable along said sliding rails of said support frame, said slide holder carrying a positioning member at a back side thereof; and
a locking mechanism, said locking mechanism comprising a casing affixed to said support frame, an upper stop member and a lower stop member, said upper stop member having pivot connection means disposed at a top side thereof and pivotally swingingly connected to said casing, said lower stop member having pivot connection means disposed at a top side thereof and pivotally connected to said casing below an elevation of said upper stop member;
wherein when said support frame is rotated from said operative vertical position to said non-operative horizontal position, said upper stop member and said lower stop member are forced by gravity thereof to turn out of said casing so that said upper stop member stops said positioning member from outward displacement to lock said slide holder and said positioning member is limited by said lower stop member to prohibit said slide holder from an inward displacement.

2. The collapsible lockable support frame assembly as claimed in claim 1, wherein said casing comprises a stop block disposed at an elevation above said upper stop member for stopping said upper stop member when said upper stop member is turned out of said casing.

3. The collapsible lockable support frame assembly as claimed in claim 1, wherein said positioning member comprises a positioning rod protruded from a back side thereof for stopping said upper stop member to lock said slide holder when said upper stop member is turned out of said casing.

4. The collapsible lockable support frame assembly as claimed in claim 1, wherein said lower stop member comprises a position limit hole; said positioning member comprises a stop edge and a plug portion, said plug portion being inserted into said position limit hole when said lower stop member is turned out of said casing and said stop edge being stopped against said lower stop member to prohibit said slide holder from inward displacement after insertion of said plug portion into said position limit hole.

5. The collapsible lockable support frame assembly as claimed in claim 1, wherein said casing comprises two side flanges disposed at two opposite lateral sides thereof and a mounting through hole on each said side flange; said upper stop member is a substantially U-shaped member, and the pivot connection means of said upper stop member comprises a pivot hole located on each of two opposite lateral sides thereof and respectively pivotally connected to the mounting through holes on said side flanges of said casing with a pivot shaft.

6. The collapsible lockable support frame assembly as claimed in claim 1, wherein said casing comprises two side flanges disposed at two opposite lateral sides thereof and a mounting through hole on each said side flange; the pivot connection means of said lower stop member comprises a pivot hole pivotally connected between the mounting through holes on the side flanges of said casing with a pivot shaft.

7. The collapsible lockable support frame assembly as claimed in claim 1, wherein said lower stop member comprises a double beveled bottom edge.

8. The collapsible lockable support frame assembly as claimed in claim 1, wherein said support frame comprises a plurality of locating holes and mounting holes; said casing of said locking mechanism comprises a plurality of locating rods and mounting holes respectively fastened to the locating holes and mounting holes of said support frame.

9. The collapsible lockable support frame assembly as claimed in claim 1, wherein said positioning member comprises at least one locating portion disposed at a top side thereof; said support frame comprises a receptacle located on a top side thereof and holding a constant force spring, said constant force spring having a distal end thereof affixed to said at least one locating portion of said positioning member.

10. The collapsible lockable support frame assembly as claimed in claim 9, wherein said support frame comprises a bumper mounted thereon in front of said constant force spring between said slide holder and said positioning member, said bumper having top and bottom ends thereof affixed to said support frame; said positioning member comprises two extension portions extended from two opposite lateral sides thereof and a mounting through hole located on each said extension portion and fastened to said slide holder.

11. The collapsible lockable support frame assembly as claimed in claim 1, wherein said support frame comprises two side flanges respectively disposed at two opposite lateral sides thereof; said sliding rails are respectively affixed to the side flanges of said support frame; said slide holder comprises two sliding blocks respectively fixedly disposed at two opposite lateral sides thereof and respectively slidably coupled to said sliding rails.

12. A collapsible lockable support frame assembly pivotally connected to a stand with at least one pivot shaft and biasable relative to said stand between a non-operative horizontal position and an operative vertical position, comprising:
a support frame, said support frame comprising two sliding rails arranged in parallel at two opposite lateral sides thereof;
a slide holder coupled to and movable along said sliding rails of said support frame, said slide holder comprising a positioning rod and a stop edge disposed at a back side thereof; and
a locking mechanism, said locking mechanism comprising a casing affixed to said support frame, an upper stop member and a lower stop member, said upper stop member having pivot connection means disposed at a top side thereof and pivotally swingingly connected to said casing, said lower stop member having pivot connection means disposed at a top side thereof and pivotally connected to said casing below an elevation of said upper stop member;
wherein when said support frame is rotated from said operative vertical position to said non-operative horizontal position, said upper stop member and said lower stop member are forced by gravity thereof to turn out of said casing so that said upper stop member stops said positioning rod to lock said slide holder and said stop edge is stopped against said lower stop member to prohibit said slide holder from an inward displacement.

13. The collapsible lockable support frame assembly as claimed in claim 12, wherein said lower stop member comprises a position limit hole; said slide holder comprises a plug portion, said plug portion being inserted into said position limit hole to prohibit said slide holder from inward displacement when said lower stop member is turned out of said casing.

14. The collapsible lockable support frame assembly as claimed in claim 12, wherein said casing comprises a stop block disposed at an elevation above said upper stop member for stopping said upper stop member when said upper stop member is turned out of said casing.

15. The collapsible lockable support frame assembly as claimed in claim 12, wherein said casing comprises two side flanges disposed at two opposite lateral sides thereof and a mounting through hole on each said side flange; said upper stop member is a substantially U-shaped member, and the pivot connection means of said upper stop member comprises a pivot hole located on each of two opposite lateral sides thereof and respectively pivotally connected to the mounting through holes on said side flanges of said casing with a pivot shaft.

16. The collapsible lockable support frame assembly as claimed in claim 12, wherein said casing comprises two side flanges disposed at two opposite lateral sides thereof and a mounting through hole on each said side flange; the pivot connection means of said lower stop member comprises a pivot hole pivotally connected between the mounting through holes on the side flanges of said casing with a pivot shaft.

17. The collapsible lockable support frame assembly as claimed in claim 12, wherein said lower stop member comprises a double beveled bottom edge.

18. The collapsible lockable support frame assembly as claimed in claim 12, wherein said support frame comprises a plurality of locating holes and mounting holes; said casing of said locking mechanism comprises a plurality of locating rods and mounting holes respectively fastened to the locating holes and mounting holes of said support frame.

19. The collapsible lockable support frame assembly as claimed in claim 12, wherein said slide holder comprises at least one locating portion disposed at a top side thereof; said support frame comprises a receptacle located on a top side thereof and holding a constant force spring, said constant force spring having a distal end thereof affixed to said at least one locating portion of said slide holder.

20. A collapsible lockable support frame assembly pivotally connected to a stand with at least one pivot shaft and biasable relative to said stand between a non-operative horizontal position and an operative vertical position, comprising:
   a support frame, said support frame comprising two sliding rails arranged in parallel at two opposite lateral sides thereof;
   a slide holder coupled to and movable along said sliding rails of said support frame, said slide holder comprising a stop edge disposed at a back side thereof; and
   a locking mechanism, said locking mechanism comprising a casing affixed to said support frame, an upper stop member and a lower stop member, said upper stop member having pivot connection means disposed at a top side thereof and pivotally swingingly connected to said casing, said lower stop member having pivot connection means disposed at a top side thereof and pivotally connected to said casing below an elevation of said upper stop member;
   wherein when said support frame is rotated from said operative vertical position to said non-operative horizontal position, said upper stop member and said lower stop member are forced by gravity thereof to turn out of said casing so that said stop edge stops said lower stop member to prohibit said slide holder from an inward displacement.

21. The collapsible lockable support frame assembly as claimed in claim 20, wherein said lower stop member comprises a position limit hole; said slide holder comprises a plug portion, said plug portion being inserted into said position limit hole to prohibit said slide holder from inward displacement when said lower stop member is turned out of said casing.

22. The collapsible lockable support frame assembly as claimed in claim 20, wherein said casing has two side flanges respectively disposed at two opposite lateral sides thereof and a pivot hole located on each said side flange; the pivot connection means of said lower stop member has a pivot hole at each of two opposite lateral sides thereof and pivotally connected to the pivot hole on each of the two side flanges of said casing with a pivot shaft; said lower stop member has a double beveled bottom edge.

23. A locking mechanism for a flat panel display system, comprising:
   a casing located in a flat panel display system;
   an upper stop member, said upper stop member having pivot connection means disposed at a top side thereof and pivotally swingingly connected to said casing; and
   a lower stop member, said lower stop member having pivot connection means disposed at a top side thereof and pivotally connected to said casing below an elevation of said upper stop member;
   wherein when said casing is rotated, said upper stop member and said lower stop member are forced by gravity thereof to turn out of said casing to provide a position limit effect;
   wherein said casing has a top block located on a top side thereof and adapted to stop said upper stop member when said upper stop member is turned out of said casing.

24. The locking mechanism as claimed in claim 23, wherein said lower stop member comprises a position limit hole.

25. The locking mechanism as claimed in claim 23, wherein said casing comprises two side flanges disposed at two opposite lateral sides thereof and a mounting through hole on each said side flange; said upper stop member is a substantially U-shaped member, and the pivot connection means of said upper stop member comprises a pivot hole located on each of two opposite lateral sides thereof and respectively pivotally connected to the mounting through holes on said side flanges of said casing with a pivot shaft.

26. The locking mechanism as claimed in claim 23, wherein said casing has two side flanges respectively disposed at two opposite lateral sides thereof and a pivot hole located on each said side flange; the pivot connection means of said lower stop member has a pivot hole at each of two opposite lateral sides thereof and pivotally connected to the pivot hole on each of the two side flanges of said casing with a pivot shaft; said lower stop member has a double beveled bottom edge.

27. The locking mechanism as claimed in claim 23, wherein said casing comprises a plurality of locating rods and mounting holes disposed at a back side thereof for mounting.

* * * * *